United States Patent [19]
Wachholz

[11] 3,834,228
[45] Sept. 10, 1974

[54] COIL SPRING TESTING DEVICE

[76] Inventor: Hilton J. Wachholz, 2171 Cleveland Ave., Columbus, Ohio 43221

[22] Filed: June 8, 1973

[21] Appl. No.: 368,268

[52] U.S. Cl. .................................... 73/161, 73/94
[51] Int. Cl. ............................................. G01l 1/04
[58] Field of Search ..... 73/161, 94, 91, 100, 141 R, 73/141 AB, 88 F

[56] References Cited
UNITED STATES PATENTS
2,291,561  7/1942  Reiss .................................... 73/161
2,639,613  5/1953  Richmond ............................. 73/161

Primary Examiner—Donald O. Woodiel
Attorney, Agent, or Firm—Mahoney, Miller & Stebens

[57] ABSTRACT

A device for testing heavy type coil spring consisting of a screw having upper and lower spring retainers mounted thereon for relative axial movement, the spring to be tested surrounding the screw axially between the retainers for compression. A hydraulic load cell and indicator unit is provided and the lower end of the screw is anchored to the piston thereof. The spring is compressed by a nut threaded on the upper end of the screw and the lower end of the spring rests on the cylinder of the cell, which exerts an upward pull on the piston to actuate the connected indicator to indicate the amount of pressure developed.

9 Claims, 7 Drawing Figures

COIL SPRING TESTING DEVICE

Various types of coil spring testing devices have been provided in the past but usually have been designed for testing light valve springs and not for testing heavy coil springs of the type commonly used in car-suspension systems, such as those used in suspension systems for racing cars. These devices have usually been complicated and expensive, and have been of such a nature that mounting the spring to be tested is difficult and have not effectively held the spring during testing.

The present invention provides a device which can be used to test heavy coil springs, which is of simple low-cost construction, but which is so designed that the spring can be readily mounted thereon for testing and can be readily removed when testing is completed, and will effectively retain the spring in proper position during testing. Furthermore, the device can be readily actuated to give a quick accurate reading on the strength of the spring. Also, the device can be ruggedly constructed and of compact configuration for convenience of handling and portability.

The best mode contemplated in carrying out this invention is illustrated in the accompanying drawings in which.

Figure 1:
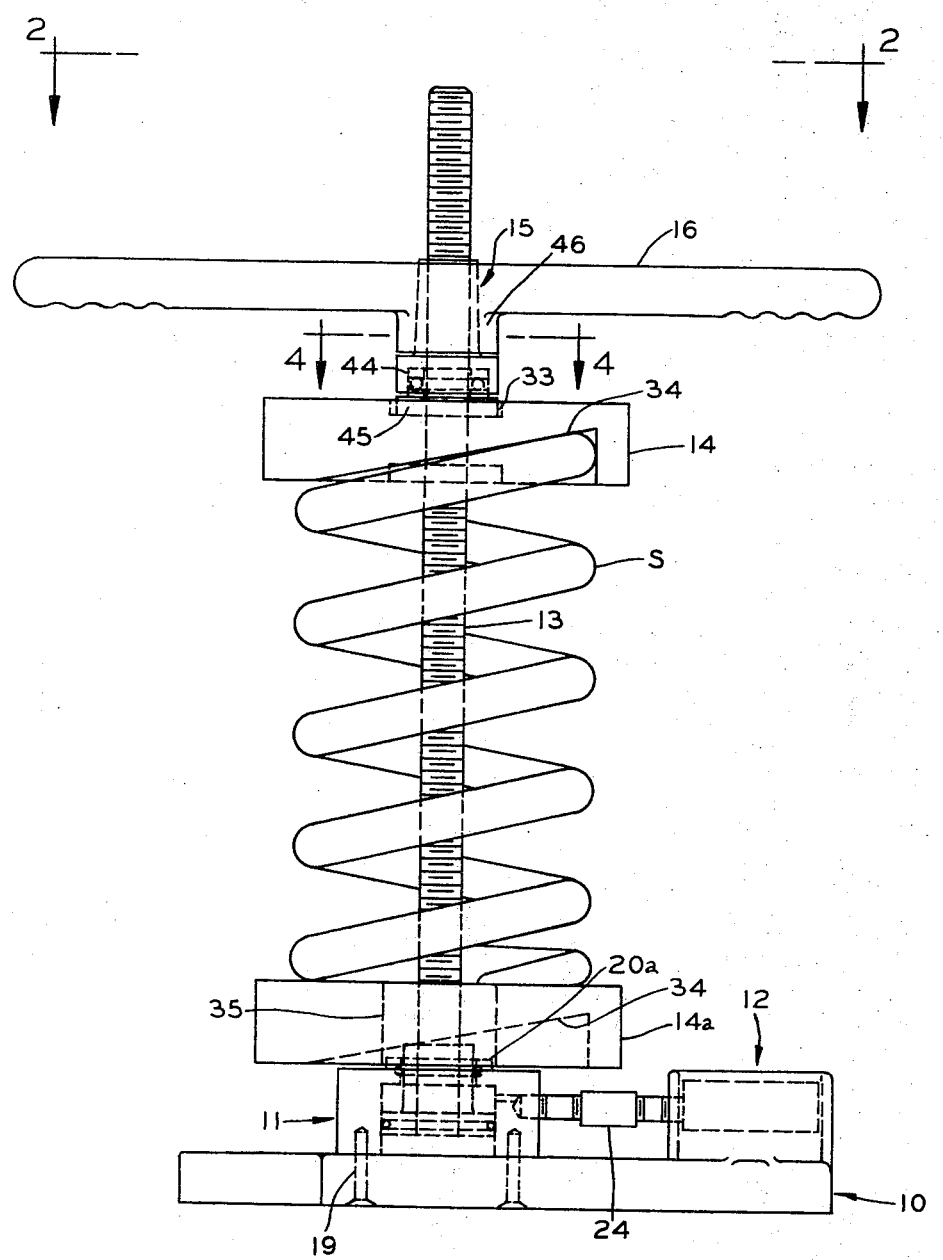
FIG. 1 is a side elevational view of the spring testing device with a spring in place to be tested.
Figure 2:
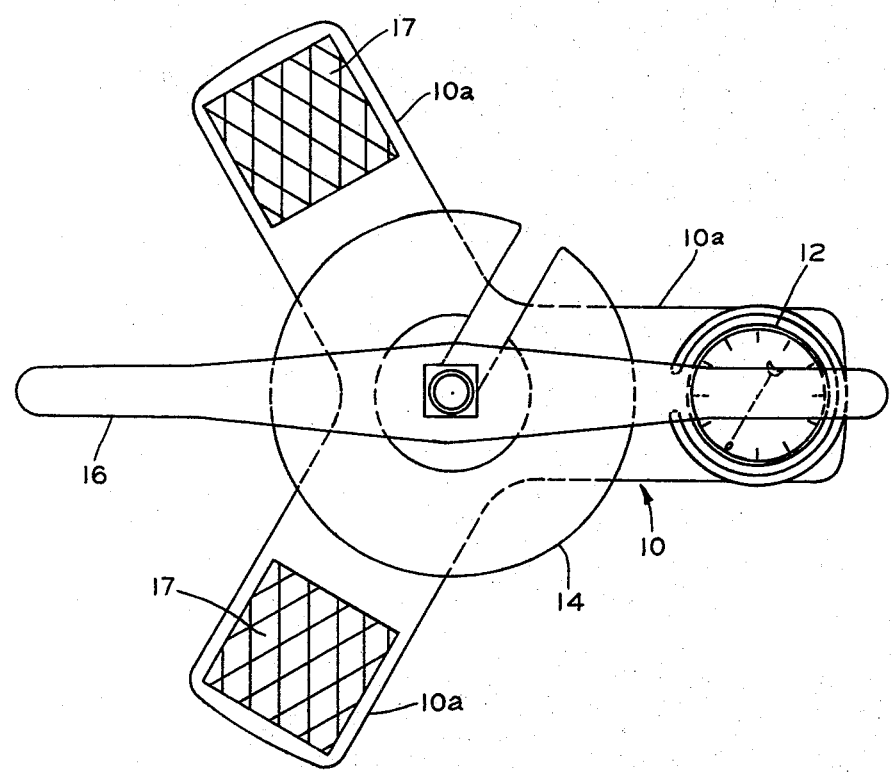
FIG. 2 is a top plan view taken from the position indicated at line 2—2 of FIG. 1.
Figure 3:
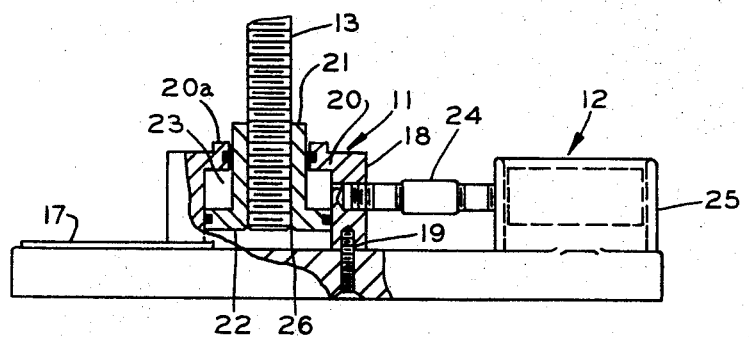
FIG. 3 is a view partly in side elevation and partly in section of the lower portion of the device.
Figure 4:
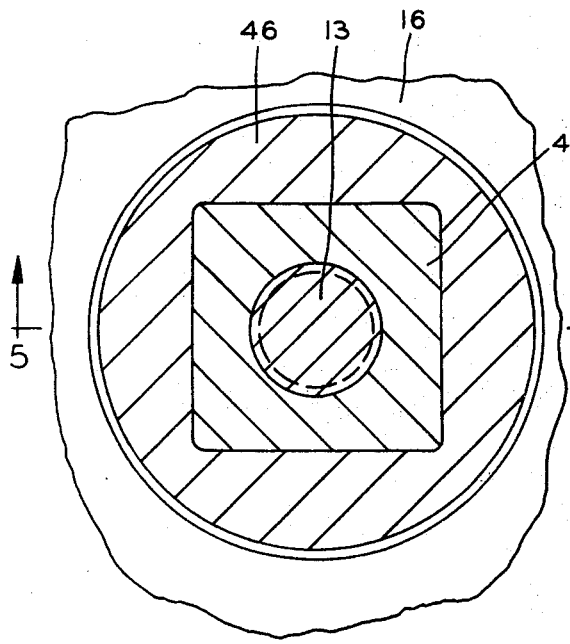
FIG. 4 is an enlarged horizontal sectional view taken on line 4—4 of FIG. 1.
Figure 5:
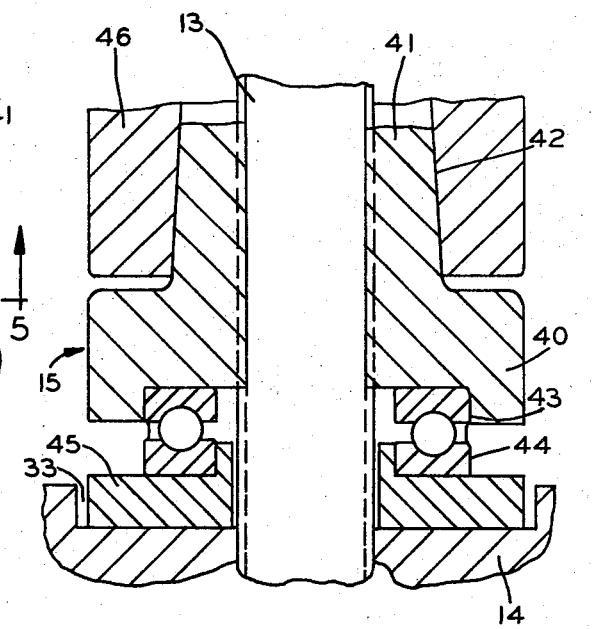
FIG. 5 is a fragmentary axial sectional view taken along line 5—5 of FIG. 4.

With reference to the drawings, the device of this invention is useful in testing the compression of coil springs under a predetermined load and one of these springs is indicated in FIG. 1 by the reference character S and as being mounted on the device in position to be tested.

The device is shown generally as comprising a base 10, a hydraulic load cell 11 and connected indicator gauge 12 carried at the upper side thereof, a vertically disposed screw 13 upstanding from the load cell and operatively connected thereto, an upper spring retainer 14 and a lower spring retainer 14a to be mounted on the screw 13 above and below the spring S to be axially movable relative to the screw S, a nut 15 threaded on the upper end of the screw for engaging with the upper retainer 14, and a turning handle 16 removably mounted on the nut.

The base 10 may be of metal and of suitable spider-like form being shown with the three radially extending legs 10a which are equally angularly spaced. Two of the legs may have friction pads 17 on their upper surfaces adjacent their outer ends to be engaged by the toes of a person using the device to hold it firmly on the floor. The remaining leg has the gauge 12 supported thereon at its outer end. This gauge may be any suitable hydraulically actuated type.

The load cell 11 consists of a cylinder 18 which is mounted centrally on the base 10 and is secured in place by the bolts 19 extending upwardly through the base. The upper end of the cylinder is provided with an inwardly extending flange 20 which carries an O-ring in engagement with the upward tubular extension 21 forming part of a piston 22, which also carries an O-ring that engages the interior of the cylinder 18. Flange 20 is provided with an upwardly projecting central annular lip 20a. Thus, an annular chamber 23, containing hydraulic fluid, is provided in the upper part of the cylinder 18 above the piston 22. This chamber is connected through a tube 24 to the housing 25 of the gauge 12. Thus, upward movement of the piston 22 in the cylinder 18 will actuate the gauge 25.

The screw 13 is of considerable extent and is disposed vertically being connected at its lower end to the piston 22. This is preferably accomplished by passing the lower end of the screw through the extension 21 and piston 22 and fixing its lower end thereon to prevent relative axial movement, such as by staking at its lower extremity as indicated at 26.

Figure 6:
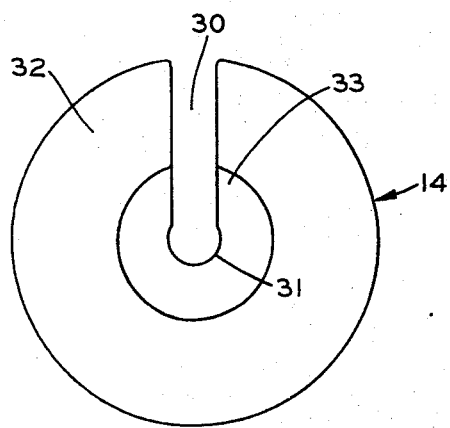
FIG. 6 is a plan view of one face of the upper spring retainer.
Figure 7:
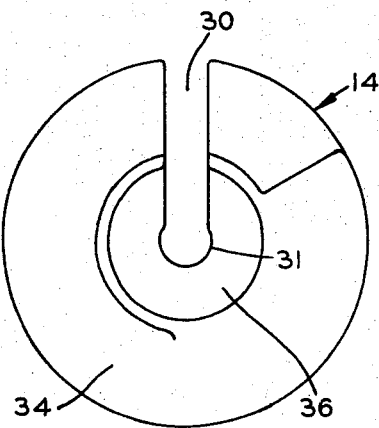
FIG. 7 is a plan view of the other face of the spring retainer.

As indicated, for mounting the spring S on the screw 13, an upper spring retainer 14 and a lower spring retainer 14a are used. Each of these retainers is reversible so that it can be used with either face in contact with the associated spring end which in some instances is flat and others is helical. Each retainer is in the form of a relatively thick disc which has a radial slot 30 extending thereinto with a slightly enlarged semi-circular socket 31 at its inner end to enclose the screw but permit relative axial movement. The one face of the upper retainer is indicated in FIG. 6 as having an annular flat surface 32, against which the straight end of the spring may engage and which surrounds a recessed central socket 33. The other face is indicated in FIG. 7 and is provided with a helical inclined surface 34 around a central socket 36 of the same diameter as the socket 33 in the opposed face. The lower retainer 14a (FIG.1) is almost identical but has a bore 35 extending completely therethrough instead of the opposed sockets 33 and 36.

The nut 15 is of angular or square cross-section and includes a flanged lower portion 40 and an upstanding extension 41 for receiving the handle 16 and which has a downwardly and outwardly tapered surface 42. A central opening extends through the nut and is threaded to receive the threaded screw 13. The lower side of the nut is provided with a socket 43 for receiving the upper race of a thrust-bearing 44 which includes a lower thrust collar 45. The diameter of this collar is such that it will just fit into the socket 33 of the spring retainer 14.

The handle 16 may be a straight member with opposed radially extending arms but could be of other form. It is provided with a depending central socket member 46 of complemental angular outline and of a complemental reverse taper to the tapered surface 42 on the nut 15. When the socket member 46 is slipped downwardly onto the upstanding nut portion 41, it will fit tightly thereon without contacting the flange 40 of the nut.

In using the testing device described above, it will be understood that the screw 13 is always upstanding from the base 10. As indicated, either face of either retainer 14 or 14a may be in engagement with the spring S depending on whether it is flat or helical. The handle 16 will be removed and the lower retainer 14a will be slipped into position with its helical surface 34 shown upwardly. The retainer can be slipped radially onto the screw because of the slot 30 provided therein and can be positioned on the base by dropping it to slip the lower end of its bore 35 over the upwardly projecting locating lip 20a of the cylinder 18 on which it will rest. The spring S will now be slipped axially downwardly over the nut 15 and onto the lower part of the screw 13 with its lower flat end resting on the lower retainer 14a which is shown with its flat surface 32 upwardly. The upper retainer 14 will now be slipped radially into place on the screw 13 above the upper end of the spring S with its helical surface 34 in engagement with the helical upper end of the spring, the retainer being horizontal. Next the nut 15 is turned by hand downwardly on the screw until the thrust collar 45 is positioned in the upwardly opening socket 33 of the retainer 14. Then the removed handle 16 is slipped into place on the nut 15. The handle 16 is now turned to rotate the nut 15 and move the upper retainer 14 downwardly towards the lower retainer 14a which will be kept seated on the base. Simultaneously, the screw 13 will exert an upward pull on the piston 22 to actuate the gauge 25 to indicate the compression load applied on the springs. The length of the compressed spring may now be measured with a rule to give the amount of compression under a selected load. To remove the spring, it is merely necessary to reverse the rotation of handle 16 to release the spring, slip the upper retainer 14 off the screw 13, remove the handle from the nut 15, and then slip the spring axially upwardly over the nut and off the upper end of the screw.

It will be apparent that this invention provides a simple inexpensive testing device which is very effective. Mounting of the spring on the device and removal of it therefrom can be accomplished with ease. When the spring is once in place for testing, it will be effectively located and held during testing.

Having thus described the invention, what is claimed is:

1. A testing device for testing coil springs comprising;

a screw adapted to receive the spring when it is slipped axially thereon;
   movable support means for supporting the screw adjacent one end for axial movement;
   spring support means including a lower spring retainer adjacent the one end of the screw for supporting the adjacent end of the spring so that said movable screw support means can move axially relative to the spring and spring support means;
   a nut threaded on the screw for engaging the opposite end of the spring by means of an upper spring retainer to compress it on said spring support means and to thereby exert an axial pull on said screw; and
   indicating means operatively connected to said screw for indicating the amount of pull on said screw.

2. A testing device according to claim 1 including:
   said screw support means includes a hydraulic load cell including a cylinder and a piston;
   said screw being anchored to the piston; said indicating means comprising a pressure-actuated gauge connected to said cylinder.

3. A testing device according to claim 1 in which:
   each of said spring retainers is of disc-like form and is provided with a radial slot so it can be slipped radially onto the screw.

4. A testing device according to claim 1 in which:
   each of said spring retainers has opposed spring-end engaging faces;
   one of said faces being flat and the other being helical.

5. A testing device according to claim 1 in which:
   a turning handle removably mounts on said nut.

6. A testing device according to claim 2 in which:
   each of said spring retainers is of disc-like form and is provided with a radial slot so it can be slipped radially onto the screw;
   each of said spring retainers has opposed spring-end engaging faces;
   one of said faces being flat and the other being helical; and
   said nut having a turning handle removably mounted on said nut.

7. A testing device according to claim 6 in which:
   said piston has a sleeve extension extending upwardly through an opening in the top of the cylinder;
   a lip on the top surrounding the opening; and
   the lower retainer having a base which fits over said lip.

8. A testing device according to claim 7 in which:
   the upper retainer has a central socket in each face; and
   said nut carries a thrust bearing at its lower side for fitting into either of the sockets.

9. A testing device according to claim 8 in which:
   said nut has an upward angular and tapered extension; and
   said turning handle has a complemental socket for receiving the extension when it is mounted on the nut.

* * * * *